United States Patent [19]
Cosmano et al.

[11] Patent Number: 5,454,750
[45] Date of Patent: Oct. 3, 1995

[54] COATED ABRASIVE CONTAINING ERODABLE AGGLOMERATES

[75] Inventors: Richard J. Cosmano; Ernest J. Duwell, both of St. Paul, Minn.

[73] Assignee: Minnesota Mining and Manufacturing Company, St. Paul, Minn.

[21] Appl. No.: 831,083

[22] Filed: Feb. 5, 1992

Related U.S. Application Data

[63] Continuation of Ser. No. 594,104, Oct. 9, 1990, abandoned.

[51] Int. Cl.⁶ .............................. B24B 1/00; B24D 11/00
[52] U.S. Cl. .............................. 451/526; 51/295; 51/298; 451/533
[58] Field of Search .............................. 51/295, 293, 298, 51/394, 401, 204

[56] References Cited

U.S. PATENT DOCUMENTS

| | | | |
|---|---|---|---|
| Re. 29,808 | 10/1978 | Wagner | 51/401 |
| 3,266,878 | 8/1966 | Timmer et al. | 51/298 |
| 3,888,640 | 6/1975 | Bigorajski et al. | 51/298 |
| 3,926,585 | 12/1975 | Lukowski | 51/295 |
| 4,021,208 | 5/1977 | Oberbichler | 51/295 |
| 4,311,489 | 1/1982 | Kressner | 51/298 |
| 4,314,827 | 2/1982 | Leitheiser et al. | 51/298 |
| 4,381,188 | 4/1983 | Waizer et al. | 51/298 |
| 4,652,275 | 3/1987 | Bloecher et al. | 51/298 |
| 4,799,939 | 1/1989 | Bloecher et al. | 51/293 |
| 5,011,512 | 4/1991 | Wald et al. | 51/295 |

Primary Examiner—Bruce M. Kisliuk
Assistant Examiner—Eileen P. Morgan
Attorney, Agent, or Firm—Gary L. Griswold; Walter N. Kim; David L. Weinstein

[57] ABSTRACT

Coated abrasive article comprising a backing bearing on at least one major surface thereof erodable agglomerates and abrasive grains, wherein the erodable agglomerates consist essentially of a grinding aid, and optionally, a binder. The erodable agglomerates can be above, between, or beneath the abrasive grains, or the erodable agglomerates can be above, between, and beneath the abrasive grains. The coated abrasive article of this invention utilizes a higher level of grinding aid than coated abrasive articles of the prior art.

33 Claims, 2 Drawing Sheets

COATED ABRASIVE CONTAINING ERODABLE AGGLOMERATES

This is a continuation of application no. 07/594,104 Oct. 9, 1990 now abandoned.

BACKGROUND OF THE INVENTION

1. Field of the Invention

This invention relates to coated abrasive products, and, more particularly, to coated abrasive products containing both erodable agglomerates and individual abrasive grains.

2. Discussion of the Art

Coated abrasive products comprise a backing having abrasive grains bonded thereto by one or more binders. These binders typically comprise a glutinous or resinous adhesive, and, optionally, additional ingredients. Examples of resinous adhesives include phenolic resins, epoxy resins, urethane resins, acrylate resins, and urea-formaldehyde resins. Examples of typical additives include grinding aids, fillers, wetting agents, surfactants, pigments, coupling agents, and dyes.

It is known that the addition of grinding aids improves the abrading characteristics of coated abrasive products. It is believed that grinding aids significantly affect the chemical and physical processes of abrading to bring about improved performance. Grinding aids are especially effective in abrading stainless steel and exotic metal alloys. In some instances, a coated abrasive product containing a grinding aid in the binder can abrade up to 100% more stainless steel than a corresponding coated abrasive product in which the binder does not contain a grinding aid.

Typically, the binder for a coated abrasive comprises from about 10 to about 50 percent by weight resinous adhesive and from about 50 to about 90 percent by weight grinding aid. If greater amounts of grinding aid are employed, there tends to be an adverse effect on abrading performance, because grinding aids tend to weaken the binder.

Accordingly, it is desired to provide a means for utilizing a higher level of grinding aid in a coated abrasive product without significantly reducing the strength of the binder.

SUMMARY OF THE INVENTION

This invention provides a coated abrasive article comprising a backing bearing on at least one major surface thereof erodable agglomerates and abrasive grains, wherein the erodable agglomerates comprise:

(a) a binder and a grinding aid; or (b) a grinding aid.

In one embodiment, the erodable agglomerates can be disposed underneath, between, and above the abrasive grains. In another embodiment, the erodable agglomerates can be disposed between the abrasive grains. In another embodiment, the erodable agglomerates can be disposed underneath the abrasive grains. In another embodiment, the erodable agglomerates can be disposed above the abrasive grains. Each of these embodiments also encompasses variations within its general configuration. The erodable agglomerate may contain non-abrasive additives that affect the erodability of the agglomerate.

The erodable agglomerate preferred for this invention contains a binder and a grinding aid. In this embodiment, the agglomerate erodes during the abrading process so that fresh grinding aid is introduced to the abrading interface.

DETAILED DESCRIPTION

As used herein, the term "abrasive grains" includes both individual abrasive grains and multi-grain granules comprising a plurality of abrasive grains.

Figure 1:
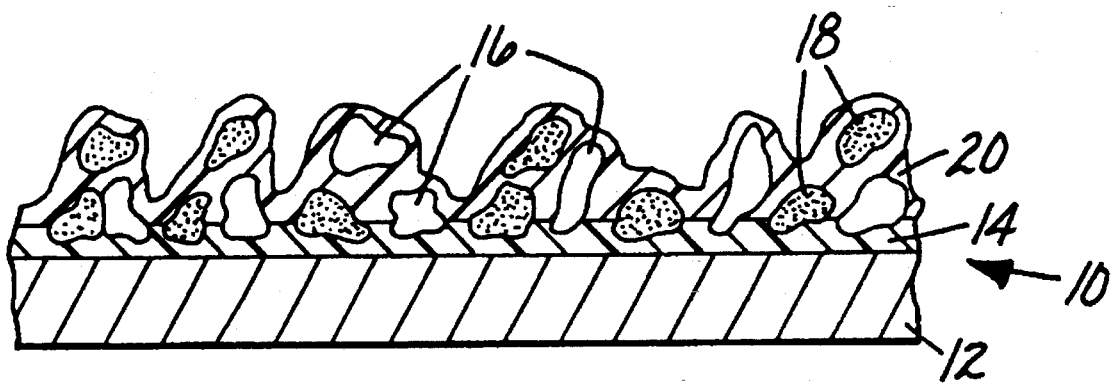
FIG. 1 is a side view of a coated abrasive article of this invention wherein the erodable agglomerates are disposed underneath, between, and above the abrasive grains.

Referring to FIG. 1, coated abrasive article 10 comprises a backing 12, a binder 14 adhered to at least one major surface of backing 12, a multiplicity of abrasive grains 16, a multiplicity of erodable agglomerates 18, and a binder 20. Binder 14 secures abrasive grains 16 and erodable agglomerates 18 to backing 12. Binder 20 also secures abrasive grains 16 and erodable agglomerates 18 to backing 12. Binder 14 will hereafter be referred to as the make coat. Binder 20 will hereafter be referred to as the size coat.

Backing 12 can be made of any material that is compatible with the material of binder 14 and that exhibits sufficient integrity for the expected abrading process. Examples of materials suitable for backing 12 include fibrous sheets, polymeric sheets, paper, cloth, non-woven sheets, treated versions of these materials, and combinations of these materials.

Binder 14 typically comprises a resinous or glutinous adhesive, and, in many cases, can optionally include other materials. Examples of resinous adhesives suitable for this invention include phenolic resins, urea-formaldehyde resins, urethane resins, acrylate resins, aminoplast resins, epoxy resins, and combinations thereof. Optional other materials that can be used in the binder include grinding aids, fillers, wetting agents, coupling agents, surfactants, dyes, and pigments.

Abrasive grains 16 suitable for this invention typically have a hardness of least about 7 on the Mohs' scale. Preferably, the abrasive grains of the invention have a hardness of from about 9 to about 10 on the Moh scale. Examples of such abrasive grains include diamond, cubic boron nitride, boron carbide, alumina zirconia, tungsten carbide, silicon carbide, fused aluminum oxide, heat-treated aluminum oxide, silicon nitride coated silicon carbide, ceramic aluminum oxide, garnet, and mixtures thereof. The abrasive grains preferred for this invention are ceramic aluminum oxide and alumina zirconia. Examples of multi-grain granules that are suitable for use in this invention are described in U.S. Pat. Nos. Reissue 29,808; 4,311,489; 4,652,275; and 4,799,939, incorporated herein by reference.

The erodable agglomerates of this invention can be provided in one of two forms. In one form, the erodable agglomerate can consist essentially of a binder and a grinding aid. In another form, the erodable agglomerate can consist essentially of a grinding aid. In either form, the erodable agglomerate may contain other additives that do not adversely affect the erodability of the agglomerate. The agglomerate cannot contain abrasive particles, i.e., particles having a Mohs' hardness in excess of 7, because such particles adversely affect the action of the grinding aid. Erodable agglomerates are typically formed to a desired shape, e.g., spherical, cylindrical, irregularly shaped.

When the erodable agglomerate includes a binder, the binder of the erodable agglomerate can be inorganic or organic. Examples of inorganic binders include cements, calcium oxide, clay, silica, magnesium oxide, aluminum oxide, etc. Examples of organic binders include waxes, phenolic resins, urea-formaldehyde resins, urethane resins, acrylate resins, aminoplast resins, glue, polyvinyl alcohol, epoxy resins, and combinations thereof. The preferred organic binder is a wax having a high melting temperature. It is believed that the wax binder provides a lubricating effect during abrading, thereby increasing the abrading ability of the coated abrasive article. Examples of waxes suitable for the erodable agglomerates include carnauba wax and paraffin wax.

As used herein a "grinding aid" is a particulate material that has a significant effect on the chemical and physical processes of abrading, thereby resulting in improved performance of a coated abrasive article. It is believed that the grinding aid will (1) decrease the friction between the abrasive grains and the workpiece being abraded, (2) prevent the abrasive grain from "capping", i.e. prevent metal particles from becoming welded to the tops of the abrasive grains, (3) decrease the interface temperature between the abrasive grains and the workpiece, or (4) decrease the grinding force required. In general, the addition of a grinding aid increases the useful life of a coated abrasive. Examples of classes of grinding aids, which include a wide variety of different inorganic and organic materials, include waxes, organic halides, halide salts, and metals and their alloys. Organic halides, such as polyvinyl chloride, will typically break down during abrading and release a halogen acid or a gaseous halide compound. Examples of organic halides include chlorinated waxes, such as, tetrachloronaphthalene and pentachloronaphthalene, and polyvinyl chloride. Chlorinated waxes can also be considered to be waxes. Examples of halide salts include sodium chloride, potassium cryolite, cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, metallic sulfides, and graphite. It is also within the scope of this invention to use a combination of different grinding aids. In some instances, combining grinding aids may produce a synergistic effect. The preferred grinding aids of this invention are cryolite and potassium tetrafluoroborate. Grinding aids are considered to be non-abrasive, i.e., the Mohs' hardness of grinding aids is less than 7.

The size of the grinding aid in the erodable agglomerate that contain a binder can range from about 0.5 micrometer to about 500 micrometers, preferably from about 10 micrometers to about 150 micrometers.

The percentage of grinding aid in the erodable agglomerate that contains a binder can vary from 5 to 90% by weight, preferably from about 60 to 90% by weight, of the erodable agglomerate. The remainder of this erodable agglomerate will comprise binder and other optional additives. The erodable agglomerate should contain at least about 1% by weight binder, preferably about 5 to 10% by weight binder.

The erodable agglomerate that does not contain a binder can consist essentially of a grinding aid. The grinding aid can be selected from those materials described previously. The grinding aid may contain trace amounts of impurities. In this particular form of erodable agglomerate, the binder is absent and the grinding aid has a particle size sufficiently large to form an erodable agglomerate. In the agglomerate that does not contain a binder, the preferred grinding aids are polyvinyl chloride pellets and potassium tetrafluoroborate.

Erodable agglomerates that contain a binder can contain other additives such as dyes, pigments, wetting agents, curing agents, surfactants, and organic fillers. Representative examples of organic fillers include wood pulp and wood flour. Erodable agglomerates containing grinding aids may additionally contain an inorganic particulate material that is not considered to be a grinding aid, such as, for example, glass bubbles. However, as stated previously, the erodable agglomerates cannot contain abrasive particulate material, as this material adversely affects the activity of the grinding aid.

Whether or not the erodable agglomerates contain a binder, erodable agglomerates suitable for this invention must be erodable, i.e., during the abrading process, the agglomerate must break down or wear away to expose a fresh new surface. Erosion of the erodable agglomerate continuously introduces unused grinding aid to the abrading interface to bring about improved performance.

The ratio of the size of the erodable agglomerate to the size of the abrasive grains can range from about 2.5:1 to about 0.5:1. It is preferred that the erodable agglomerate be about the same size as the abrasive grains. This range applies to erodable agglomerates whether or not they contain a binder.

Erodable agglomerates that contain a binder can be made according to the following procedure. The non-abrasive, inorganic particulate material or the grinding aid and the glutinous adhesive or resinous adhesive are introduced into a mixing vessel. The resulting mixture is stirred until it is homogeneous. It is preferred that there be sufficient liquid in the mixture that the resulting mixture is neither excessively stiff nor excessively runny. Most glutinous adhesives and resins contain sufficient liquid to permit adequate mixing. After the mixing step is complete, the mixture is caused to solidify, preferably by means of heat or radiation energy. Solidification results from either the removal of liquid from the mixture or the polymerization of the resinous adhesive. After the mixture is solidified, it is crushed to form agglomerates, which are then graded to the desired size. Devices suitable for this step include conventional jaw crushers and roll crushers.

If the binder of the agglomerate is a wax, it is preferred that the erodable agglomerate be made according to the following procedure. The wax is heated to just above its melting temperature. Then the heated wax and the non-abrasive, inorganic particulate material or the grinding aid are introduced into a heated screw type extruder, and the resulting mixture is stirred until it is homogeneous. Next, the mixture is run through the die of the extruder, and the resulting extrudate is cooled and crushed to form agglomerates, which are then graded to the desired size.

The crushing and grading procedures described above frequently provide agglomerates of an undesirable size. The improperly-sized agglomerates can either be recycled, e.g., by being added to a new dispersion, or discarded.

Erodable agglomerates that contain a grinding aid but no binder can be made by dispersing the grinding aid in an appropriate medium, e.g., water, organic solvent, drying the dispersion to form a cake, crushing the cake, and grading the particles to the desired size.

The coated abrasive article of FIG. 1 can be made by first thoroughly mixing the binder for preparing make coat 14, abrasive grains 16, and erodable agglomerates 18, then applying the mixture to backing 12, and at least partially curing the binder to form make coat 14. Then, the binder for preparing size coat 20 is applied over make coat 14, abrasive grains 16, and erodable agglomerates 18, and make coat 14 and size coat 20 are completely cured.

Figure 2:
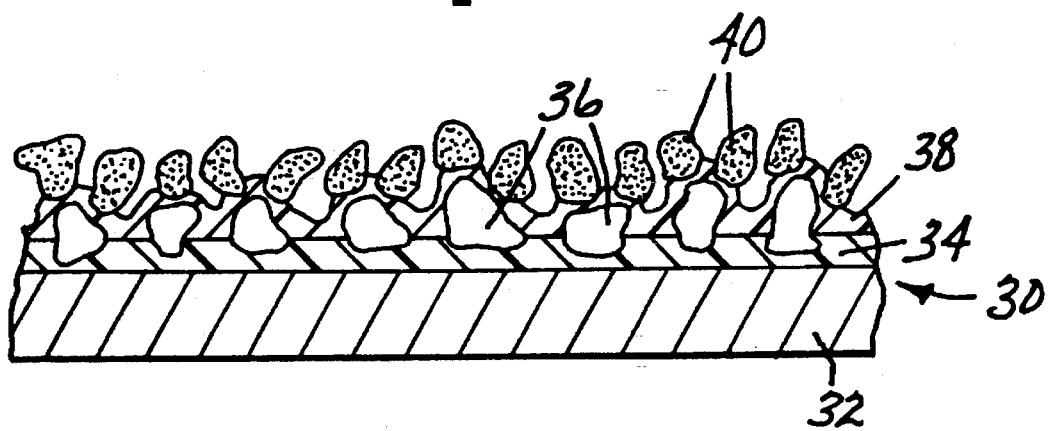
FIG. 2 is a side view of a coated abrasive article of this invention wherein the erodable agglomerates are disposed above the abrasive grains.

In FIG. 2, coated abrasive article 30 comprises a backing 32, a make coat 34 overlying at least one major surface of backing 32, a multiplicity of abrasive grains 36 supported by backing 32 and adhered thereto by make coat 34, a size coat 38 overlying abrasive grains 36 and make coat 34, and a multiplicity of erodable agglomerates 40 adhered to size coat 38. Materials suitable for backing 32, erodable agglomerates 40, and abrasive grains 36 can be the same as those used in the coated abrasive article of FIG. 1. Make coat 34 and size coat 38 can be made of the same material or of different materials, and these materials can be the same as those used for the binders described in the coated abrasive article of FIG. 1.

The coated abrasive article of FIG. 2 can be made according to the following procedure. Make coat 34 is applied to backing 32; then a multiplicity of abrasive grains 36 are electrostatically coated onto make coat 34. Make coat 34 is precured. Next, size coat 38 is applied over abrasive grains 36; then a multiplicity of erodable agglomerates 40 are drop coated onto size coat 38. Both make coat 34 and size coat 38 are completely cured.

Figure 3:
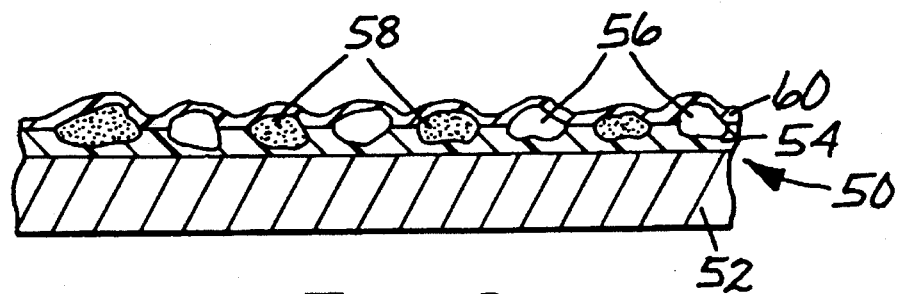
FIG. 3 is a side view of a coated abrasive article of this invention wherein the erodable agglomerates are disposed between the abrasive grains.

In FIG. 3, coated abrasive article 50 comprises a backing 52, a make coat 54 overlying at least one major surface of backing 52, a multiplicity of abrasive grains 56 and a multiplicity of erodable agglomerates 58 supported by and adhered to backing 52 by make coat 54, and a size coat 60 overlying erodable agglomerates 58 and abrasive grains 56. The materials suitable for backing 52, erodable agglomerates 58, and abrasive grains 56 can be the same as were described for the coated abrasive article of FIG. 1. Make coat 54 and size coat 60 can be made of the same material or of different materials, and these materials can be the same as were described for the binder of the coated abrasive article of FIG. 1.

The coated abrasive article of FIG. 3 can be made according to the following procedure. Erodable agglomerates 58 and abrasive grains 56 are combined and mixed thoroughly. Make coat 54 is applied to backing 52; then the mixture of abrasive grains 56 and erodable agglomerates 58 can be drop-coated or electrostatically coated onto make coat 54. Make coat 54 is then precured. Next, size coat 60 is applied over abrasive grains 56, erodable agglomerates 58, and make coat 54, and make coat 54 and size coat 60 are completely cured.

Figure 4:
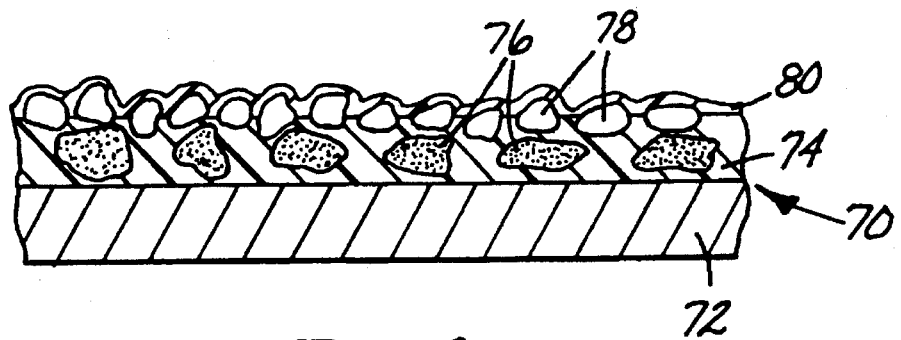
FIG. 4 is a side view of a coated abrasive article of this invention wherein the erodable agglomerates are disposed below the abrasive grains.

Coated abrasive article 70 of FIG. 4 comprises a backing 72, a make coat 74 overlying at least one major surface of backing 72, a multiplicity of erodable agglomerates 76 supported by and adhered to backing 72 by make coat 74, a multiplicity of abrasive grains 78 overlying erodable agglomerates 76, and a size coat 80 overlying abrasive grains 78. The materials suitable for backing 72, erodable agglomerates 78, and abrasive grains 76 can be the same as were described for the coated abrasive article of FIG. 1. Make coat 74 and size coat 80 can be made of the same material or of different materials, and these materials can be the same as were described for the binder of the coated abrasive article of FIG. 1.

The coated abrasive article of FIG. 4 can be made according to the following procedure. Make coat 74 is applied to backing 72; then a multiplicity of erodable agglomerates 76 are drop-coated onto make coat 74. Next, a multiplicity of abrasive grains 78 are electrostatically coated over erodable agglomerates 76. Make coat 74 is then pre-cured. Next, size coat 80 is applied over abrasive grains 78, and make coat 74 and size coat 80 are completely cured.

Figure 5:
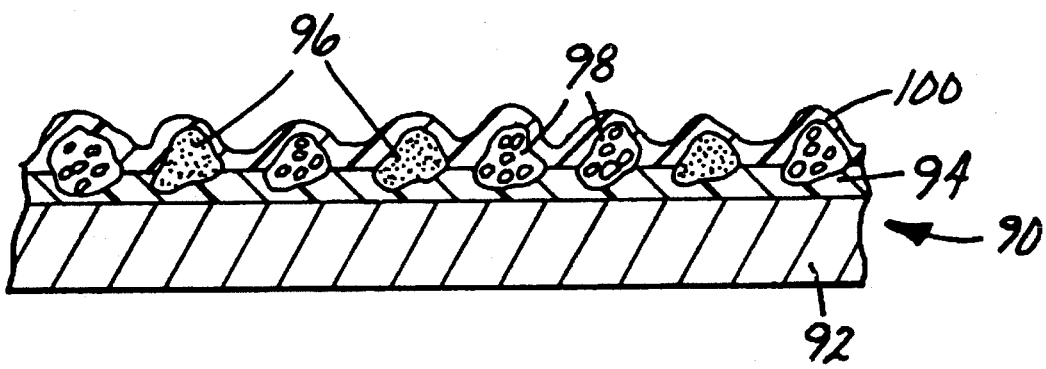
FIG. 5 is a side view of a coated abrasive article of this invention wherein the erodable agglomerates are disposed between abrasive grains that are multi-grain granules.

In FIG. 5, coated abrasive article 90 comprises a backing 92, a make coat 94 overlying at least one major surface of backing 92, a plurality of erodable agglomerates 96 and a plurality of abrasive grains 98 supported by and adhered to backing 92 by make coat 94, and a size coat 100 overlying erodable agglomerates 96, abrasive grains 98, and make coat 94. The abrasive grains are disposed primarily between the erodable agglomerates. In FIG. 5, however, multi-grain granules are used instead of individual abrasive grains. Such abrasive grains are described in U.S. Pat. Nos. 4,652,275 and 4,799,939, incorporated herein by reference. The materials suitable for backing 92 and erodable agglomerates 96 can be the same as were described for the coated abrasive article of FIG. 1. Make coat 94 and size coat 100 can be made of the same material or of different materials, and these materials can be the same as were described for the binder of the coated abrasive article of FIG. 1.

The coated abrasive article of FIG. 5 can be made according to the following procedure. Erodable agglomerates 96 and abrasive grains 98 are combined and mixed thoroughly. Make coat 94 is applied to backing 92; then the mixture of abrasive grains 98 and erodable agglomerates 96 is drop-coated onto make coat 94. Make coat 94 is then precured. Next, size coat 100 is applied over abrasive grains 98, erodable agglomerates 96, and make coat 94, and make coat 94 and size coat 100 are completely cured.

Figure 6:
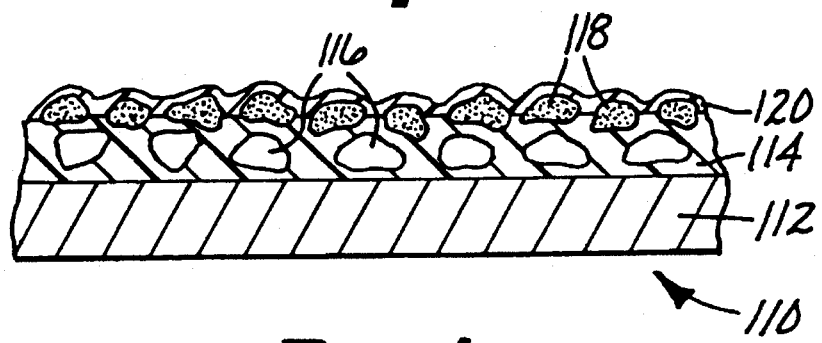
FIG. 6 is a side view of a coated abrasive article of this invention wherein the erodable agglomerates are disposed above the abrasive grains.

In FIG. 6, coated abrasive article 110 comprises a backing 112, a make coat 114 overlying backing 112, a plurality of abrasive grains 116 supported by and adhered to backing 112 by make coat 114, a plurality of erodable agglomerates 118 overlying abrasive grains 116, and a size coat 120 overlying abrasive grains 116, erodable agglomerates 118, and make coat 114. Most of abrasive grains 116 are disposed underneath erodable agglomerates 118. The materials suitable for backing 112, erodable agglomerates 118, and abrasive grains 116 can be the same as were described for the coated abrasive article of FIG. 1. Make coat 114 and size coat 120 can be made of the same material or of different materials, and these materials can be the same as were described for the binder of the coated abrasive article of FIG. 1.

The coated abrasive article of FIG. 6 can be made according to the following procedure. Make coat 114 is applied to backing 112; then a multiplicity of abrasive grains 116 are electrostatically coated onto make coat 114. Next, a multiplicity of erodable agglomerates 118 are drop-coated over abrasive grains 116. Make coat 114 is then precured. Next, size coat 120 is applied over abrasive grains 116, and make coat 114 and size coat 120 are completely cured.

Figure 7:
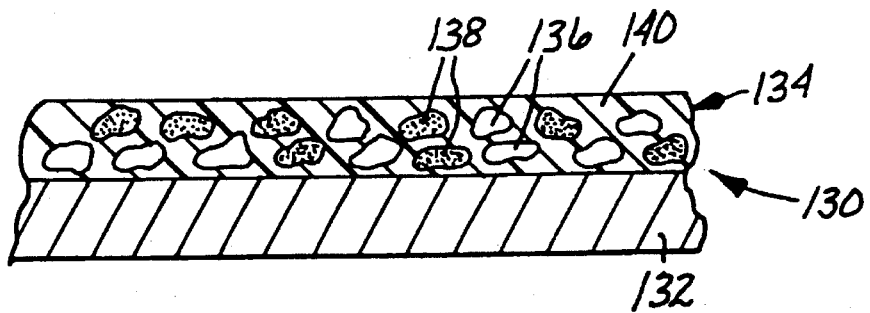
FIG. 7 is a side view of a coated abrasive article of this invention wherein the erodable agglomerates are disposed underneath, between, and above the abrasive grains.

In FIG. 7, coated abrasive article 130 is a lapping film comprising a backing 132 bearing on one major surface thereof a layer 134 comprising abrasive grains 136 and erodable agglomerates 138 uniformly dispersed in a binder 140. Backing 132, binder 140, abrasive grains 136, and erodable agglomerates 138 can be of the same materials as those used in the coated abrasive article of Example 1.

The coated abrasive article of FIG. 7, can be made according to the following procedure. Erodable agglomerates 138, abrasive grains 136, and binder 140 are thoroughly mixed. The resulting mixture is applied to backing 132 and then cured.

In each of the embodiments, the volume of erodable agglomerates to the volume of abrasive grains can range from about 0.08:1 to about 1.75: 1, preferably from about 0.5:1 to about 1:1.

The following non-limiting examples will further illustrate the invention. All of the percentages are based upon weight, unless indicated otherwise.

PREPARATION OF ERODABLE AGGLOMERATES

Preparation A

Paraffin wax was dissolved in warm methylene dichloride ($CH_2Cl_2$) to form a 10% solution. While the solution was still warm, it was added to a warmed plastic mill containing alumina milling media. Next, the grinding aid was added to the mill, and the resulting mixture was milled for several hours, after which time the milling media was removed. The resulting slurry was dried for several days at 40° C. to form a cake. The cake was then broken up into small clumps by passing it through a 14 mesh sieve. The erodable agglomerates were then screened such that the average particle size thereof was −24 +48. The resulting erodable agglomerates consisted of 10% by weight paraffin wax and 90% by weight grinding aid.

Preparation B

Paraffin wax was heated to 90° C., and, along with a grinding aid, was introduced into a heated screw type mixer. The two materials were thoroughly mixed; after mixing, the mixture was cooled. After cooling, the mixture was crushed and screened such that the average particle size thereof was −24 +48.

Preparation C

Preparation C was identical to Preparation B, except that carnauba wax was employed and the wax was heated to 100° to 110° C.

PREPARATION OF COATED ABRASIVE DISCS

Preparation D

First, grade 50 abrasive grains were blended with erodable agglomerates. Second, a 0.76 mm thick vulcanized fiber backing having a 2.2 cm diameter center hole was coated with a conventional calcium carbonate filled resole phenolic resin (83% by weight solids) to form a make coat. The wet coating weight was approximately 270 g/m². Third, the mixture of abrasive grains and erodable agglomerates were electrostatically coated onto the make coat. The weight of the abrasive grains was approximately 480 g/m². Fourth, the abrasive article was precured for 150 minutes at 93° C. Then, a conventional calcium carbonate filled resole phenolic resin (83% by weight solids) was applied over the abrasive grains, the erodable agglomerates, and the make coat at an average weight of approximately 280 g/m². The resulting product was cured for 11 ½ hours at 93° C. After this step, the coated abrasive disc was flexed and tested.

Preparation E

First, a 0.76 mm thick vulcanized fiber backing having a 2.2 cm diameter center hole was coated with a conventional calcium carbonate filled resole phenolic resin (83% by weight solids) to form a make coat. Second, grade 50 abrasive grains were electrostatically coated onto the make coat at a weight of approximately 480 g/m². Third, the resulting article was precured for 150 minutes at 93° C. A conventional calcium carbonate filled resole phenolic resin (83% by weight solids) was applied over the abrasive grains and the make coat to form a size coat. Fourth, erodable agglomerates were drop coated onto the uncured size coat. The resulting product was cured for 11 ½ hours at 93° C. After this step, the coated abrasive disc was flexed and tested.

Preparation F

The procedure of Preparation E was repeated except that the weight of the abrasive grains was approximately 600 g/m².

PROCEDURE FOR TESTING THE COATED ABRASIVE DISCS

A coated abrasive disc was installed on a conventional air grinder. The disc was mounted on a beveled aluminum back up pad and used to grind the face of a 18.4 cm by 2.54 cm 304 stainless steel workpiece. The air pressure to the grinder was approximately 6.1 kg/cm². The portion of the coated abrasive overlying the beveled edge of the back up pad contacted the workpiece at a 6.8 kg load.

The workpiece was weighed before and after an abrading cycle to determine the amount of cut, i.e. how much stainless steel was removed in thirty seconds. When the coated abrasive disc removed less than 10 g over two consecutive cycles, the test was deemed ended. In Tables I through IV, the coated abrasive performance was stated as percent of control, i.e., the total amount of metal removed for the control example was equated to 100% and the amounts of metal removed by the coated abrasive articles of the examples of the invention were measured relative to the control. The results are based upon an average of two discs per example.

Examples 1 through 4 and Control Examples A and B

The results for these examples are set forth in Table I. The abrasive grain used in these examples was grade 50 fused aluminum oxide. The coated abrasive of Control Example A was made according Preparation D except that it did not contain any erodable agglomerates. Control Example B was a commercially available fiber disc, Three-M-ite Type C coated abrasive disc, available from Minnesota Mining and Manufacturing Company, St. Paul, Minn.

TABLE I

| Example no. | Preparation of erodable agglomerate | Inorganic particulate material | Weight of erodable agglomerate (g/m²) | Preparation of disc | Cut (% of control A) |
| --- | --- | --- | --- | --- | --- |
| Control A | — | — | — | — | 100 |
| Control B | — | — | — | — | 160 |
| 1 | A | $KBF_4$ | 120 | D | 420 |
| 2 | A | $KBF_4$ | 124 | E | 440 |
| 3 | A | $K_3AlF_6$ | 124 | E | 430 |
| 4 | A | $CaCO_3$ | 128 | E | 220 |

Examples 5 and 6 and Control Examples. B through G

The results for these examples are set forth in Table II. The abrasive grain used in these examples was fused aluminum oxide. Control Example B was a commercially available fiber disc, Three-M-ite Type C coated abrasive disc, available from Minnesota Mining and Manufacturing Company, St. Paul, Minn. The coated abrasive disc of Control Example C was made according to Preparation F, except that it did not contain any erodable agglomerates.

Control Example D

A coated abrasive disc was prepared according to the following procedure. First, a 0.76 mm thick vulcanized fiber backing having a 2.2 cm diameter center hole was coated with a composition consisting of a conventional calcium carbonate filled resole phenolic resin (83% by weight solids) to form a make coat. The wet coating weight was approximately 270 g/m². Second, grade 50 fused aluminum oxide abrasive grains were electrostatically coated onto the make coat at a weight of approximately 600 g/m². Third the resulting abrasive article was precured for 150 minutes at 93° C. Fourth, a composition consisting of 48% resole phenolic resin and 52% $KBF_4$ was applied over the abrasive grains and the make coat at an average weight of approximately 280 g/m² to form a size coat. The resulting product was cured for 11 ½ hours at 93° C. After this step, the coated abrasive disc was flexed and tested.

Control Example E

The coated abrasive disc for Control Example E was made and tested in the same manner as was that of Control Example C, except that a supersize coat was applied over the size coat. The supersize coat consisted of 48% resole phenolic resin and 52% $KBF_4$ and was coated at a weight of approximately 260 g/m².

Control Example F

The coated abrasive disc for Control Example F was made and tested in the same manner as was that of Control Example D, except that $KBF_4$ was replaced with an equal amount by weight of $K_3AlF_6$. The weight of the size coat was approximately 236 g/m².

Control Example G

The coated abrasive disc for Control Example G was made and tested in the same manner as was that of Control Example E, except that $KBF_4$ was replaced with an equal amount by weight of $K_3AlF_6$. The weight of the supersize coat was approximately 232 g/m².

TABLE II

| Example no. | Preparation of erodable agglomerate | Inorganic particulate material | Weight of erodable agglomerate (g/m²) | Preparation of disc | Cut (% of control C) |
| --- | --- | --- | --- | --- | --- |
| Control B | — | — | — | — | 160 |
| Control C | — | — | — | — | 100 |
| Control D | — | — | — | — | 370 |
| Control E | — | — | — | — | 210 |
| Control F | — | — | — | — | 210 |
| Control G | — | — | — | — | 240 |
| 5 | A | $KBF_4$ | 128 | F | 600 |
| 6 | A | $K_3AlF6$ | 128 | F | 600 |

Examples 7 and 8 and Control Examples H through L

The coated abrasive articles of Example 7 and 8 were prepared according to the procedure described in Preparation F. In Example 7, the erodable agglomerates were made of $KBF_4$. In Example 8, the erodable agglomerates were made of $K_3AlF_6$. The abrasive grain used in these examples was grade 50 ceramic aluminum oxide made according to the teachings of U.S. Pat. No. 4,314,827. The results for these examples are set forth in Table III.

Control Example H

Control Example H was a commercially available fiber disc, Regal coated abrasive disc, available from Minnesota Mining and Manufacturing Company, St. Paul, Minn. This disc contained a size coat that consisted of 66% by weight $Na_3AlF_6$, 32% by weight resole phenolic resin, and 2% by weight iron oxide pigment.

Control Example I

The coated abrasive disc for Control Example I was made and tested in the same manner as was that of Control Example D, except that the abrasive grain was grade 50 ceramic aluminum oxide. The weight of the size coat was 320 g/m².

Control Example J

The coated abrasive disc for Control Example J was made and tested in the same manner was that of as Control Example E, except that the abrasive grain was grade 50 ceramic aluminum oxide. The weight of the supersize coat was 232 g/m².

Control Example K

The coated abrasive disc for Control Example K was made and tested in the same manner as was that of Control Example F, except that the abrasive grain was grade 50 ceramic aluminum oxide. The weight of the size coat was 320 g/m².

Control Example L

The coated abrasive disc for Control Example L was made and tested in the same manner as was that Control Example G, except that the abrasive grain was grade 50 ceramic aluminum oxide. The weight of the supersize coat was 240 g/m².

TABLE III

| Example no. | Preparation of erodable agglomerate | Inorganic particulate material | Weight of erodable agglomerate (g/m²) | Preparation of disc | Cut (% of control H) |
|---|---|---|---|---|---|
| Control H | — | — | — | — | 100 |
| Control I | — | — | — | — | 145 |
| Control J | — | — | — | — | 269 |
| Control K | — | — | — | — | 40 |
| Control L | — | — | — | — | 200 |
| 7 | A | $KBF_4$ | 128 | F | 401 |
| 8 | A | $K_3AlF_6$ | 128 | F | 267 |

Examples 9 through 17

These examples demonstrate the use of paraffin and carnauba waxes as binders for erodable agglomerates. The abrasive grain used in these examples was grade 50 ceramic aluminum oxide.

Control Example M

The coated abrasive for this example was made according to Preparation F, except that the disc did not contain any erodable agglomerates.

TABLE IV

| Example no. | Preparation of erodable agglomerate | Inorganic particulate material | Weight of erodable agglomerate (g/m²) |
|---|---|---|---|
| Control M | — | — | — |
| 9 | C | $CaCO_3$ | 120 |
| 10 | C | $Na_3AlF_6$ | 120 |
| 11 | C | $KBF_4$ | 120 |
| 12 | C | NaCl | 120 |
| 13 | B | $KBF_4$ | 120 |
| 14 | C | NaCl | 120 |
| 15 | C | $Na_2CO_3$ | 120 |
| 16 | C | $Na_2SO_4$ | 120 |
| 17 | C | KCl | 120 |

| Example no. | Ratio of binder to particulate material in the agglomerate | Preparation of Disc | Cut (% of Control M) |
|---|---|---|---|
| Control M | — | — | 100 |
| 9 | 30:70 | F | 135 |
| 10 | 30:70 | F | 179 |
| 11 | 30:70 | F | 456 |
| 12 | 30:70 | F | 233 |
| 13 | 25:75 | F | 258 |
| 14 | 25:75 | F | 254 |
| 15 | 25:75 | F | 154 |
| 16 | 25:75 | F | 150 |
| 17 | 25:75 | F | 242 |

The data in Table IV show that the coated abrasive discs containing the carnauba wax had a higher initial cut than corresponding discs containing paraffin wax.

Examples 18 and 19 and Control Examples N and O

These examples demonstrate the use of clay as a binder for the erodable agglomerate. The coated abrasive was tested according to the following procedure. The coated abrasive was first converted into a 7.6 cm by 335 cm endless belt. The belt was installed on a constant load surface grinder. A pre-weighed, 304 stainless steel workpiece, approximately 2.5 cm by 5 cm by 18 cm, was mounted in a holder, positioned vertically, with the 2.5 cm by 18 cm face confronting approximately 36 cm diameter A durometer serrated rubber contact wheel with one on one lands over which was entrained the coated abrasive belt. The workpiece was then reciprocated vertically through a 18 cm path at the rate of 20 cycles per minute, while a spring loaded plunger urged the workpiece against the belt with a load of 9 kg as the belt was driven at a rate of about 2050 m/min. After one minute of grinding time, the workpiece holder assembly was removed and reweighed, the amount of stock removed calculated by subtracting the weight after grinding from the original weight. A new, pre-weighed workpiece and holder were then mounted on the equipment. The experimental error on this test was +/−10%. The test was deemed complete in 20 minutes. The test results are set forth in Table V.

Example 18

Erodable agglomerates were made according to the following procedure. Into a blade mixer were charged 9 kg of Peerless #14 clay, 22.5 kg of water, and 3.6 kg of graphite. The charge was thoroughly mixed; then 27 kg of $KBF_4$ was added slowly, and the charge mixed until it was homogeneous. The resulting mixture was then placed into 1.25 cm trays and dried at 80° C. for approximately 12 hours. The resulting dried mixture was crushed and screened. The crushed, screened agglomerates were heated at 200° C. overnight. The agglomerates were screened such that the average particle size thereof was −30 +48.

A coated abrasive article was prepared according to the following procedure. A composition containing 84% by weight solids and consisting of 48% resole phenolic resin and 52% calcium carbonate was applied to an X weight cotton backing at a wet weight of 290 g/m² to form a make coat. The erodable agglomerates were drop coated into the make coat at a weight of 105 g/m². Grade 50 ceramic aluminum oxide was electrostatically coated onto the make coat at a weight of 470 g/m². The resulting article was precured for 90 minutes at 88° C. A composition containing 83% by weight solids and consisting of resole phenolic resin and calcium carbonate filler was applied over the abrasive grains at a wet weight of 293 g/m² to form a size coat. The resulting article was precured for 90 minutes at 88° C. and then final cured for 10 hours at 100° C. The product was then flexed.

Example 19

The coated abrasive article of Example 19 was made in the same manner as was that of Example 18, except that the abrasive grain was a grade 50 fused alumina.

Control N

The coated abrasive article of Control Example N was a grade 50 Three-M-ite Polycut Resin Bond Cloth Product, commercially available from Minnesota Mining and Manufacturing Company, St. Paul, Minn. This product contained a $KBF_4$ grinding aid.

Control O

The coated abrasive article of Control Example O was a grade 50 Three-M-ite Resin Bond Cloth Product, commercially available from Minnesota Mining and Manufacturing Company, St. Paul, Minn.

TABLE V

| Example no. | Cut (% of Control N) |
| --- | --- |
| Control N | 100 |
| Control O | 67 |
| 18 | 45 |
| 19 | 64 |

Examples 20 through 23 and Control Examples P through S

Coated abrasives discs of Examples 20 through 23 were made according to the following procedure. A resole phenolic/acrylic latex adhesive was applied over the abrasive side of a grade 50 coated abrasive fiber disc. The disc was commercially available from Minnesota Mining and Manufacturing Company, St. Paul, Minn. Then polyvinyl chloride (PVC) particles (commercially available from the BF Goodrich Company) were drop coated onto this adhesive. For Example 2, the PVC particles had an average size of 120 micrometers, while in the remaining examples, the PVC particles had an average size of 180 micrometers. The resulting coated abrasive disc was heated for three hours at 95° C. to solidify the adhesive. The disc was then flexed and tested. The discs of the control examples did not contain any adhesive or erodable agglomerate.

The fiber discs of these examples were tested according to the following procedure. The discs were mounted on a beveled aluminum back up pad and used to grind the face of a 2.5 cm by 18 cm 310 stainless steel workpiece. The disc was driven at 5,500 rpm with the portion of the disc overlaying the beveled edge of the back up pad contacting the workpiece at 9.1 kg pressure to generate a disc wear path of about 140 cm. Each disc was used to grind a separate workpiece for one minute each until the cut in a one minute time interval was less than four grams. The total cut for the grinding test is set forth in Table VI.

TABLE VI

| Example no. | Fibre disc designation | Coating weight of the adhesive (g/m$^2$) | Coating weight of agglomerate (g/m$^2$) | Initial cut (g) | Total cut (g) |
| --- | --- | --- | --- | --- | --- |
| 20 | Regalite fibre disc | 150 | 57 | 35 | 111 |
| 21 | Blue Grit fibre disc | 131 | 38 | 23 | 145 |
| 22 | Regal fibre disc | 140 | 71 | 31 | 69 |
| 23 | Type C fibre disc | 130 | 56 | 20 | 90 |
| Control P | Regalite fibre disc | — | — | 19 | 57 |
| Control Q | Blue Grit fibre disc | — | — | 25 | 80 |
| Control R | Regal fibre disc | — | — | 12 | 42 |
| Control S | Type C fibre disc | — | — | 12 | 30 |

The data in Table VI show that the addition of the erodable agglomerate grinding aid significantly increases the abrading characteristics of coated abrasive discs.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A coated abrasive article comprising a backing bearing on and adhered to at least one major surface of said backing a multiplicity of erodable agglomerates and a multiplicity of abrasive grains, wherein said erodable agglomerates consist essentially of a grinding aid, said grinding aid having a Mohs' hardness of less than 7, said erodable agglomerates not containing abrasive particles having a Mohs' hardness in excess of 7, wherein said grinding aid is selected from the group consisting of waxes, organic halides, halide salts, metals, and alloys of metals.

2. The coated abrasive article of claim 1, wherein said erodable agglomerates and said abrasive grains are adhered to said backing by a make coat and a size coat.

3. The coated abrasive article of claim 1, wherein said erodable agglomerates and said abrasive grains are adhered to said backing by a single binder.

4. The coated abrasive article of claim 1, wherein said erodable agglomerates are disposed underneath, between, and above said abrasive grains.

5. The coated abrasive article of claim 1, wherein said erodable agglomerates are disposed underneath said abrasive grains.

6. The coated abrasive article of claim 1, wherein said erodable agglomerates are disposed above said abrasive grains.

7. The coated abrasive article of claim 1, wherein said erodable agglomerates are disposed between said abrasive grains.

8. The coated abrasive article of claim 1, wherein said erodable agglomerates further include a binder.

9. The coated abrasive article of claim 8, wherein said erodable agglomerates are disposed underneath, between, and above said abrasive grains.

10. The coated abrasive article of claim 8, wherein said erodable agglomerates are disposed underneath said abrasive grains.

11. The coated abrasive article of claim 8, wherein said erodable agglomerates are disposed above said abrasive grains.

12. The coated abrasive article of claim 8, wherein said erodable agglomerates are disposed between said abrasive grains.

13. The coated abrasive article of claim 8, wherein said erodable agglomerates and said abrasive grains are adhered to said backing by a make coat and a size coat.

14. The coated abrasive article of claim 8, wherein said erodable agglomerate and said abrasive grains are adhered to said backing by a single binder.

15. The coated abrasive article of claim 1, wherein said abrasive grains are selected from the group consisting of diamond, cubic boron nitride, boron carbide, alumina zirconia, tungsten carbide, silicon carbide, fused aluminum oxide, heat-treated aluminum oxide, silicon nitride coated silicon carbide, ceramic aluminum oxide, garnet, and mixtures thereof.

16. The coated abrasive article of claim 1, wherein said abrasive grains have a Moh hardness of at least about 7.

17. A coated abrasive article comprising a backing bearing on and adhered to at least one major surface of said backing a multiplicity of erodable agglomerates and a multiplicity of abrasive grains, wherein said erodable agglomerates consist essentially of a grinding aid, the ratio of the size of the erodable agglomerates to the size of the abrasive grains ranging from about 2.5:1 about 0.5:1.

18. A coated abrasive article comprising a backing bearing on and adhered to at least one major surface of said backing a multiplicity of erodable agglomerates and a multiplicity of abrasive grains, wherein said erodable agglomerates consist essentially of a grinding aid, said grinding aid having a Mohs' hardness of less than 7, said erodable agglomerates not containing abrasive particles having a Mohs' hardness in excess of 7, wherein said grinding aid is selected from the group consisting of chlorinated waxes, cryolites, fluoroborates, sulfur, organic sulfur compounds, metallic sulfides, and graphite.

19. The coated abrasive article of claim 18, wherein said erodable agglomerates and said abrasive grains are adhered to said backing by a make coat and a size coat.

20. The coated abrasive article of claim 18, wherein said erodable agglomerates and said abrasive grains are adhered to said backing by a single binder.

21. The coated abrasive article of claim 18, wherein said erodable agglomerates are disposed underneath, between, and above said abrasive grains.

22. The coated abrasive article of claim 18, wherein said erodable agglomerates are disposed underneath said abrasive grains.

23. The coated abrasive article of claim 18, wherein said erodable agglomerates are disposed above said abrasive grains.

24. The coated abrasive article of claim 18, wherein said erodable agglomerates are disposed between said abrasive grains.

25. The coated abrasive article of claim 18, wherein said erodable agglomerates further include a binder.

26. The coated abrasive article of claim 25, wherein said erodable agglomerates are disposed underneath, between, and above said abrasive grains.

27. The coated abrasive article of claim 25, wherein said erodable agglomerates are disposed underneath said abrasive grains.

28. The coated abrasive article of claim 25, wherein said erodable agglomerates are disposed above said abrasive grains.

29. The coated abrasive article of claim 25, wherein said erodable agglomerates are disposed between said abrasive grains.

30. The coated abrasive article of claim 25, wherein said erodable agglomerates and said abrasive grains are adhered to said backing by a make coat and a size coat.

31. The coated abrasive article of claim 25, wherein said erodable agglomerate and said abrasive grains are adhered to said backing by a single binder.

32. The coated abrasive article of claim 18, wherein said abrasive grains are selected from the group consisting of diamond, cubic boron nitride, boron carbide, alumina zirconia, tungsten carbide, silicon carbide, fused aluminum oxide, heat-treated aluminum oxide, silicon nitride coated silicon carbide, ceramic aluminum oxide, garnet, and mixtures thereof.

33. The coated abrasive article of claim 18, wherein said abrasive grains have a Moh hardness of at least about 7.

* * * * *

UNITED STATES PATENT AND TRADEMARK OFFICE
CERTIFICATE OF CORRECTION

PATENT NO.: 5,454,750

DATED: October 3, 1995

INVENTOR(S): Richard J. Cosmano and Ernest J. Duwell

It is certified that error appears in the above-identified patent and that said Letters Patent is hereby corrected as shown below: On the title page:

Section [56] References Cited, U.S. PATENT DOCUMENTS, please insert:

```
-- 1,830,757   1/1931    Hartmann       51/308
   3,997,302   12/1976   Supkis         51/295
   4,903,440   2/1990    Larson et al.  51/295--
```

Col. 12, line 26    "A" should read --60A--

Signed and Sealed this

Thirty-first Day of March, 1998

Attest:

BRUCE LEHMAN

Attesting Officer

Commissioner of Patents and Trademarks